(12) United States Patent
Saunders (10) Patent No.: US 6,415,059 B1
(45) Date of Patent: Jul. 2, 2002

(54) DATA COMPRESSION

(75) Inventor: Nicholas Ian Saunders, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/265,113

(22) Filed: Mar. 9, 1999

(30) Foreign Application Priority Data

Mar. 25, 1998 (GB) .............................................. 9806396

(51) Int. Cl.⁷ ................................................. G06K 9/36
(52) U.S. Cl. ..................... 382/239; 348/390.1; 348/475; 375/240.03; 382/239; 382/251
(58) Field of Search ................................ 382/231–239, 382/245, 251; 375/240.02–240.03, 240.13–240.16, 240.23; 348/400.1, 419.1, 390.1, 475; 386/68, 85, 111, 112; 714/800

(56) References Cited

U.S. PATENT DOCUMENTS

| | | | | |
|---|---|---|---|---|
| 5,249,053 A | * | 9/1993 | Jain ............................ | 348/231 |
| 5,461,421 A | * | 10/1995 | Moon ..................... | 375/240.13 |
| 5,481,553 A | * | 1/1996 | Suzuki et al. ................ | 714/800 |
| 5,537,215 A | * | 7/1996 | Niimura et al. ............. | 386/111 |
| 5,838,826 A | * | 11/1998 | Enari et al. .................. | 382/234 |
| 5,889,561 A | * | 3/1999 | Kwok et al. ........... | 375/240.03 |
| 5,892,545 A | * | 4/1999 | Saunders et al. ......... | 348/390.1 |
| 5,930,398 A | * | 7/1999 | Watney ....................... | 382/239 |
| 5,956,429 A | * | 9/1999 | Burns ......................... | 382/245 |
| 6,014,493 A | * | 1/2000 | Shimoda ..................... | 386/68 |
| 6,147,627 A | * | 11/2000 | Vogel ........................... | 341/50 |
| 6,266,447 B1 | * | 7/2001 | Hoshi et al. ................. | 382/236 |

FOREIGN PATENT DOCUMENTS

| | | |
|---|---|---|
| EP | 0 469 648 | 2/1992 |
| EP | 0 509 576 | 10/1992 |
| EP | 0 742 674 A2 | 11/1996 |

* cited by examiner

Primary Examiner—Jose L. Couso
Assistant Examiner—Gregory Desire
(74) Attorney, Agent, or Firm—Frommer Lawrence & Haug LLP; William S. Frommer (57) ABSTRACT

Data compression apparatus in which input data is compressed according to a target output data quantity using a stage of data quantization, the apparatus comprises: one or more trial quantizers for selecting a degree of quantization so that the target output data quantity is not exceeded; a data selector for selecting a subset of the current data to be quantized; a data store for storing the subset of data; a backsearch quantizer and dequantizer for sequentially quantizing and dequantizing the subset of data at a plurality of degrees of quantization including the degree of quantization selected by the trial quantizer(s) and one or more harsher degrees of quantization; a comparator for comparing data quantized and dequantized by the backsearch quantizer with the stored subset of data, to detect errors introduced by the quantization and dequantization by the backsearch quantizer; and a quantization selector for selecting a final degree of quantization for use in compression of the current data, the final degree of quantization being that degree detected by the comparator to introduce the fewest errors during quantization and dequantization of the subset of data by the backsearch quantizer.

9 Claims, 7 Drawing Sheets

DATA COMPRESSION

BACKGROUND OF THE INVENTION

1. Field of the Invention

This invention relates to data compression.

2. Description of the Prior Art

Some data compression systems, such as image data compression systems, use trial compressions to try to arrive at the most appropriate quantisation factor to achieve a desired output bit rate.

In one previously proposed system, trial quantisations are carried out at, say, ten possible quantisation values spread across the available range of quantisation values. The two trial quantisation values which provide an output bit rate falling either side of the desired value are identified, and a more detailed trial carried out in the reduced range between those two values. This can identify the quantisation value corresponding to the least harsh quantisation of the data which still complies with the target bit rate of the system.

However, it has been established that for some classes of data—for example, image data and/or data which has previously been compressed and decompressed—this arrangement does not necessarily provide the best quantisation value. A process sometimes referred to as "backsearch" has been devised to alleviate this problem.

The backsearch process starts with the quantisation value identified by the trial quantisations referred to above, and then tests that value and a number of adjacent values providing successively harsher degrees of quantisation. The test used is to apply quantisation followed immediately by dequantisation to the input data using each of the values under test and, in each case, to compare the resultant data with a delayed (i.e. not quantised) version of the input data. The quantisation value (of those tested) giving the fewest errors is then selected for the final, output stage of quantisation.

However, like many aspects of data compression, this additional test requires a large amount of fast processing circuitry in order to apply test quantisations and dequantisations to the input data at several quantisation values in parallel. This is a particular problem when the compression circuitry is to be implemented as an integrated circuit such as an ASIC (application specific integrated circuit).

SUMMARY OF THE INVENTION

This invention provides data compression apparatus in which input data is compressed according to a target output data quantity using a stage of data quantisation, the apparatus comprising:

- one or more trial quantisers for selecting a degree of quantisation so that the target output data quantity is not exceeded;
- a data selector for selecting a subset of the current data to be quantised;
- a data store for storing the subset of data;
- a backsearch quantiser and dequantiser for sequentially quantising and dequantising the subset of data at a plurality of degrees of quantisation including the degree of quantisation selected by the trial quantiser(s) and one or more harsher degrees of quantisation;
- a comparator for comparing data quantised and dequantised by the backsearch quantiser with the stored subset of data, to detect errors introduced by the quantisation and dequantisation by the backsearch quantiser; and
- a quantisation selector for selecting a final degree of quantisation for use in compression of the current data, the final degree of quantisation being that degree detected by the comparator to introduce the fewest errors during quantisation and dequantisation of the subset of data by the backsearch quantiser.

The invention recognises that the backsearch process can be performed and a useful result achieved using only a subset of the data to be quantised. This can dramatically reduce the amount of hardware needed to implement this function.

In a preferred embodiment, instead of being performed in parallel, the backsearch process can be performed in a time-division-multiplexed fashion using just a single set of quantiser and dequantiser.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
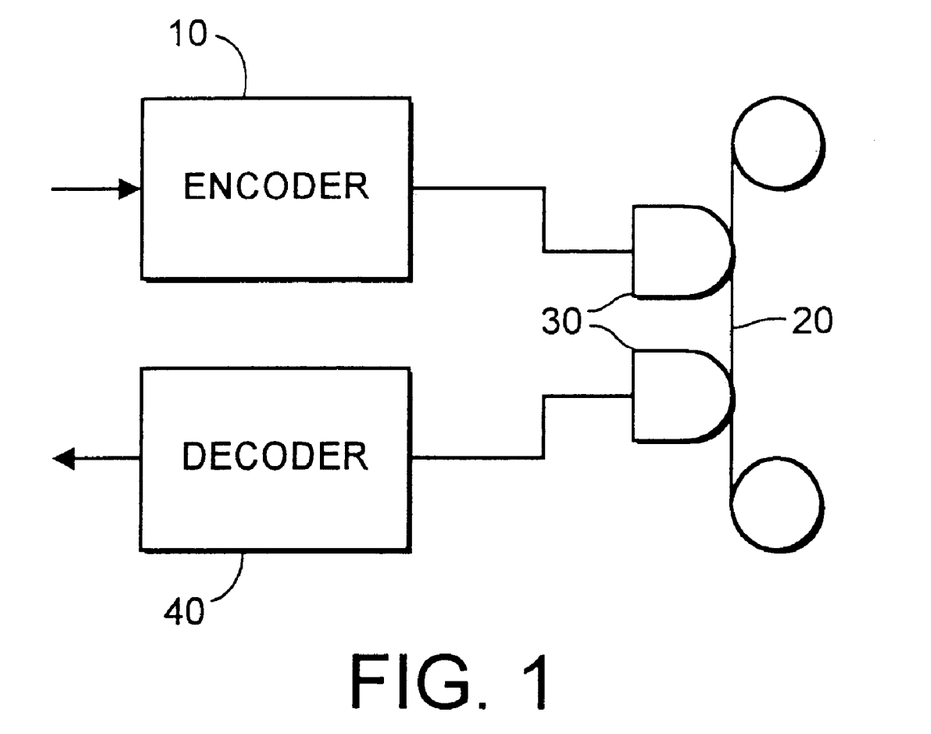
FIG. 1 is a schematic diagram of a bit-rate reducing encoder and a corresponding decoder for use with a magnetic tape channel.

FIG. 1 is a schematic diagram of a tape recording and reproducing system comprising a bit-rate reducing encoder 10, a tape channel 20, tape recording and reproducing apparatus 30 and a corresponding data decoder 40.

The encoder 10 receives an input high definition video signal and encodes it to form a bit-rate reduced (BRR) signal for recording on the tape medium. Similarly, the decoder 40 receives a BRR signal reproduced from the tape medium and decodes it to form an output high definition video signal.

A stage of error correction coding for recording, and corresponding decoding for replay (not shown) may be employed.

Figure 2:
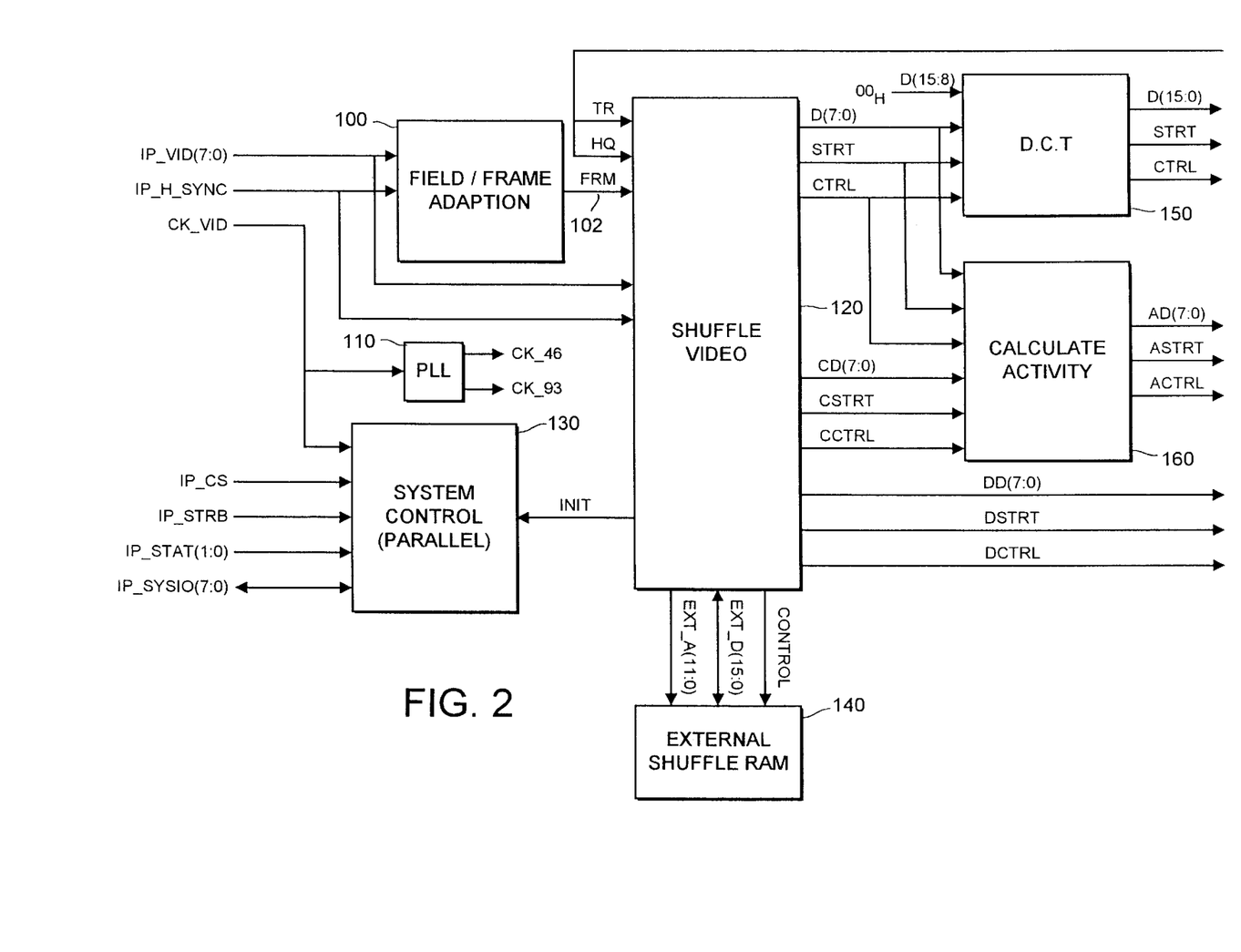
FIGS. 2 to 4 schematically illustrate the bit-rate reducing encoder of FIG. 1.

Referring now to FIG. 2, the input video signal and a video clock are supplied to a field/frame adaption circuit 100, a phase lock loop 110, a video shuffler 120 and a system controller 130.

The field/frame adaption circuit 100 is used to control switching of the encoder between a frame-based mode of operation and a field-based mode of operation. This switching occurs at a scene change, so that a field-based mode of operation is used for the frame of a scene change.

In order to detect a scene change in the input video signal, the field/frame adaption circuit 100 divides each input field into 16 blocks, each being 300 pixels by 135 lines. The dc level and variance of each block for each field are then calculated as follows:

$$dc = \Sigma(\text{pixel value})$$

$$\text{variance} = \Sigma(\text{pixel value})^2$$

The variance of the blocks is then normalised as follows:

$$\text{normalised variance} = \Sigma(\text{pixel value})^2/\Sigma(\text{pixel value})$$

The dc level and variance for each block of the two fields comprising a single frame are then compared (on a block-by-corresponding-block basis) to detect whether the two fields are considered to be similar. The following relationships are used to make this detection:
(a) if $$dc_{fld1} \times dc_{lower\ threshold} > dc_{fld0}$$

and $$dc_{fld1} \times dc_{upper\ threshold} < dc_{fld0}$$

then $dc_{fld1}$ is considered to be similar to $dc_{fld0}$
(b) if $$var_{fld1} \times var_{lower\ threshold} > var_{fld0}$$

and $$var_{fld1} \times var_{upper\ threshold} < var_{fld0}$$

then $var_{fld1}$ is considered to be similar to $var_{fld0}$

The number of dc and variance blocks that are similar between the two fields are then compared to separate thresholds:
if $$\text{number\_similar}_{dc\ blocks} > dc\ \text{block threshold}$$

and $$\text{number\_similar}_{var\ blocks} > var\ \text{block threshold}$$

then the two fields are considered to be part of the same video scene.

The result of this detection is supplied on a control output 102 from the field/frame adaption circuit 100.

The PLL 10 receives the 46.4 MHz clock supplied to the encoder and derives other clock signals required by the encoder apparatus from that clock signal.

The system controller 130 controls the apparatus to operate in the manner described.

The video shuffler 120 receives pixels of the input video signal and stores them temporarily in an external shuffle RAM 140. It then reads blocks of pixels from the external shuffle RAM according to a predetermined shuffle pattern so that blocks of pixels which are adjacent in the image are not read out at adjacent positions in the shuffle pattern.

The reason for this measure is to try to alleviate the effect of data losses (e.g. due to a tape drop-out or similar) on the picture reconstructed by the decoder apparatus. Because pixel blocks which are adjacent in the image are separated from one another in the resulting bit stream (because they are shuffled by the video shuffler 120), a short duration data loss might affect a number of pixel blocks but not their immediate neighbours in the image. This allows data concealment to be used to reconstruct the missing blocks.

The current frame is written to the external RAM while the previous frame is read, in a shuffled manner, from the external RAM.

The shuffled data from the video shuffler 120 is supplied to a discrete cosine transform (DCT unit 150), an activity calculator 160 and (referring to FIG. 3) a bit allocator 170.

Figure 3:
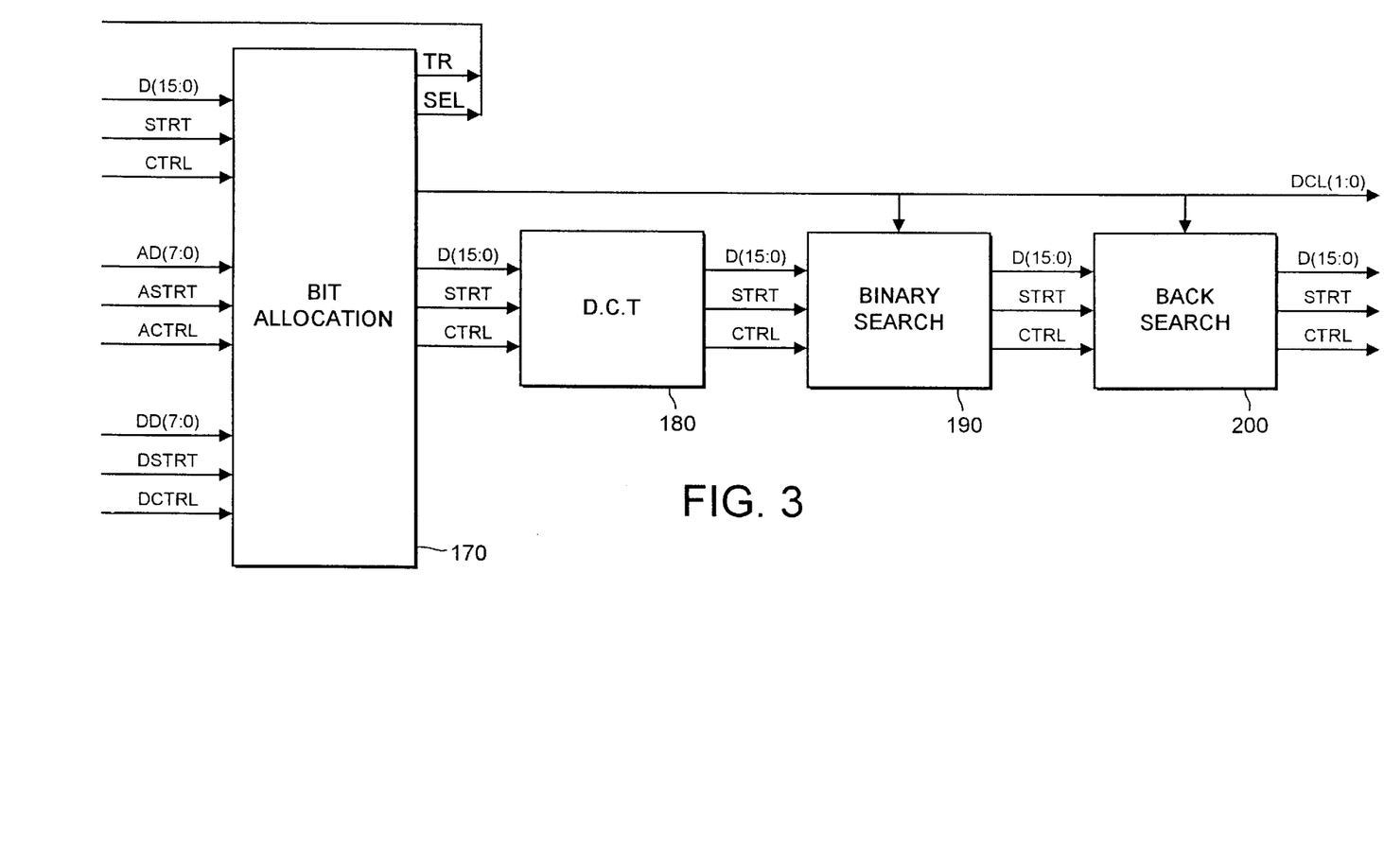

The DCT unit 150 transform each pixel block supplied from the video shuffler 120 into a corresponding block of DCT coefficients using known techniques. These coefficients are supplied to the bit allocator 170.

The activity calculator 160 generates so-called "activity codes" and corresponding offsets to be applied to the quantisation index for each block of data. These codes specify the so-called activity of each block, assessed according to the following principles:
(i) a block containing more detail (measured for example by the variance of the pixel values within the block) has a higher activity than a block having less detail;
(ii) a block predominantly containing colours associated with skin tones is quantised less harshly (i.e. given a lower notional activity) than a block predominantly not containing such colours;
(iii) a block having a very low or a very high average luminance level is quantised more harshly (i.e. given a higher notional activity) than a block having a mid-range average luminance level (Weber's law). For example, if a block's average luminance level is above 224 or below 32 (in an eight bit system) then a constant value is added to the calculation of the block's activity. If the block's average luminance level is between 32 and 224 then the activity calculation is unaltered.

In general, the activity codes are used to control the later operation of the encoder, so that pixel blocks having a higher activity are subjected to harsher compression, since it is less likely that the viewer would spot compression artifacts in that block when the block is subsequently decompressed. Blocks having a low activity, e.g. relatively "smooth" surfaces, relatively dark areas or areas having colours corresponding to skin tones, are compressed less harshly, since the user is more likely to spot compression artifacts in those areas.

The quantisation index offsets are embedded in the bitstream, whereas the activity codes (which are needed to specify the quantisation offsets to be used on decoding) are supplied separately for possible "optimisation"—see below.

The bit allocator 170 receives DCT data from the DCT encoder 150 and activity data from the activity calculator 160. The bit allocator 170 performs a trial quantization of the DCT data, followed by a trial part of an entropy encoding process.

Using these techniques, the bit allocator calculates the number of bits which would be required to encode each DCT block at one of ten quantization "base" values: 7, 13, 19, 25, 31, 37, 43, 49, 55 and 61, subject to each block's quantisation index offset calculated by the activity calculator. Ultimately, the quantization level for each block is selected to a resolution of 1 (using the scale given above), but for the purposes of the bit allocator 170, the quantization base value is assessed to the nearest 6 on that scale.

At the output of the bit allocator, therefore, a figure derived from the nearest appropriate quantization base level from the selection given above is passed, together with a delayed version of the video data, to a further DCT unit 180, a binary search unit 190 and a backsearch unit 200. This process will be described further below, but in brief, a value 2 greater than the quantisation value giving just over the required bit rate is passed by the bit allocator.

The further DCT unit 180 again calculates DCT coefficients, this time based on the delayed version of the video data.

The binary search unit 190 carries out trial quantizations at quantization levels just above or just below the base quantization level, again modified by the quantisation index offsets associated with each block, to select one value within a range of −3 to +4 with respect to the base quantization level from the bit allocator.

A further trial quantization is carried out by the backsearch unit which tests the quantization level selected by the binary search unit 190, and assesses whether a higher quantization level could be used whilst still obtaining the same or fewer quantisation errors.

Figure 4:
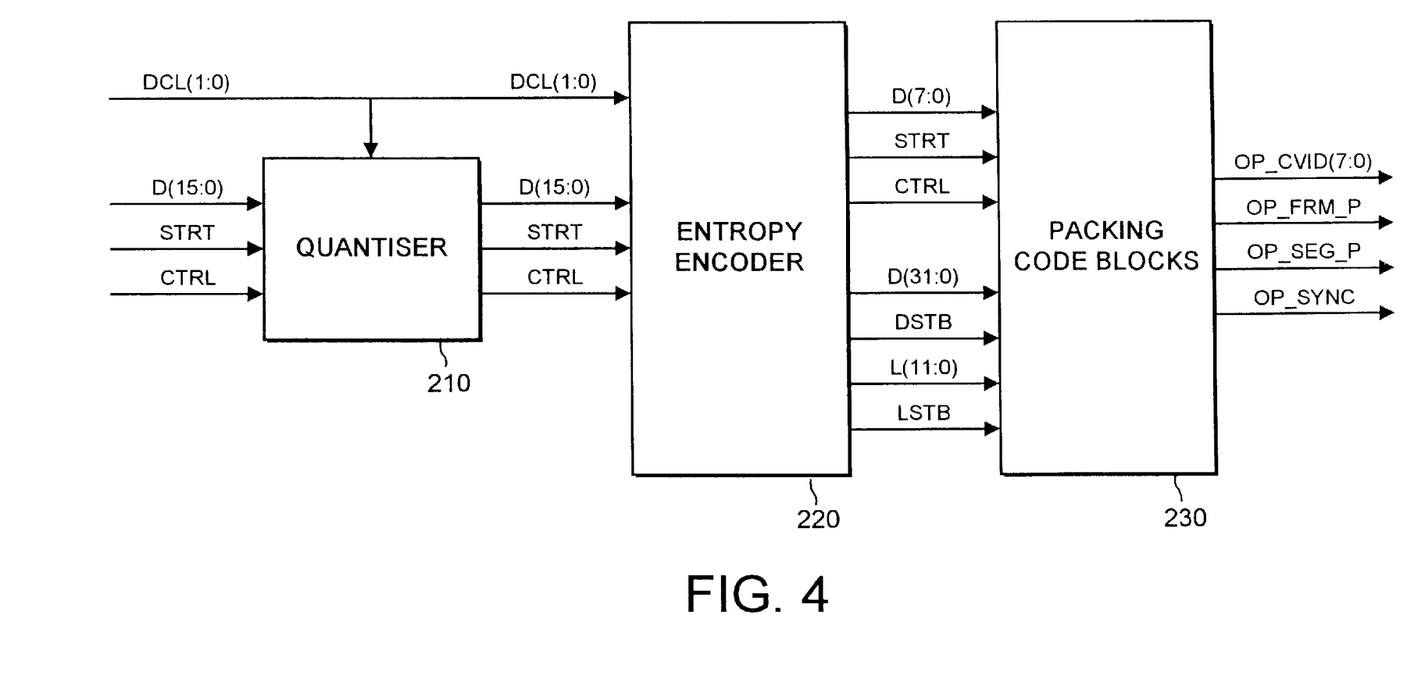

Finally, the selected quantization level, and the DCT blocks from the further DCT encoder 180, are supplied to a quantizer 210 where they are quantized according to the selected quantization level. The quantized data are passed to an entropy encoder 220 which generates variable length output data according to the standard principles of entropy encoding, so that more commonly occurring data patterns in the quantized data are encoded using shorter code words.

The data generated by the entropy encoder is then packed into "code blocks" for recording on tape by a data packer 230. The code blocks include header data, entropy-encoded data from a number of DCT blocks, activity codes associated with those blocks and an indication of the quantisation level used in forming the blocks. Error correcting codes are then applied to provide error correction when the code blocks are replayed from the tape. A code block comprises five "sync blocks", where a sync block is the smallest separately recoverable data item recorded on the tape in this system.

Figure 5:
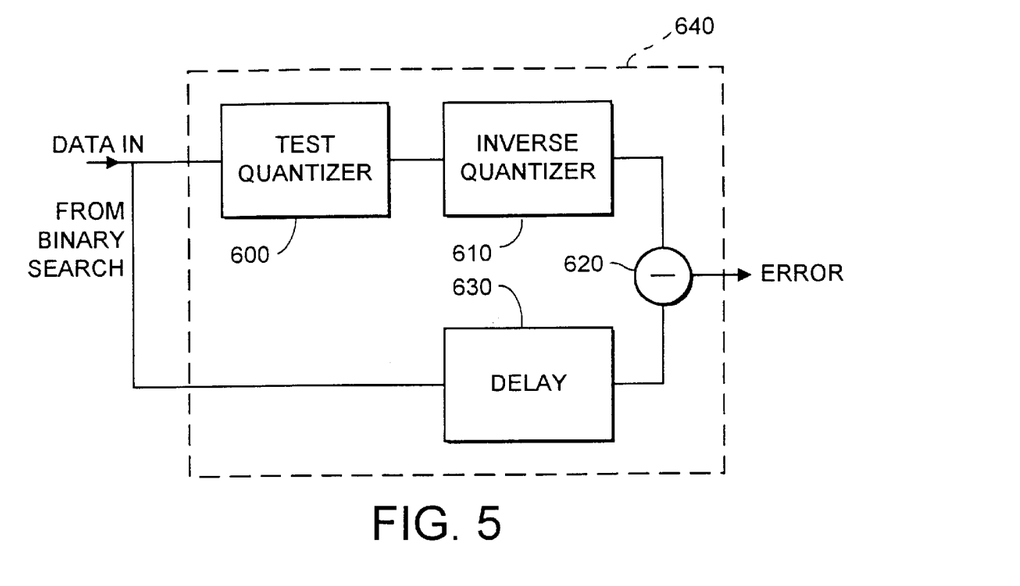
FIG. 5 schematically illustrates an element of a previously proposed backsearch unit.

FIG. 5 schematically illustrates an element of a previously proposed backsearch unit. Backsearch is a process for testing the quantization index value chosen by the binary search. As described above, binary search generates the lowest quantization index which produces fewer bits than the bit rate target. Backsearch then tests the six adjacent higher quantization indices to detect which is the best value to be used from those six choices.

In FIG. 5, an element of the backsearch unit comprises a test quantizer 600, an inverse quantizer 610 using the same quantization index as the quantizer 600, a subtracter 620 and a delay element 630. So, the DCT data is subjected to a quantization and complementary inverse quantization process, then to be subtracted from a delayed version of the original DCT data. Carried out on the whole data stream, this comparison produces an error signal at the output of the subtracter 620.

Figure 6:
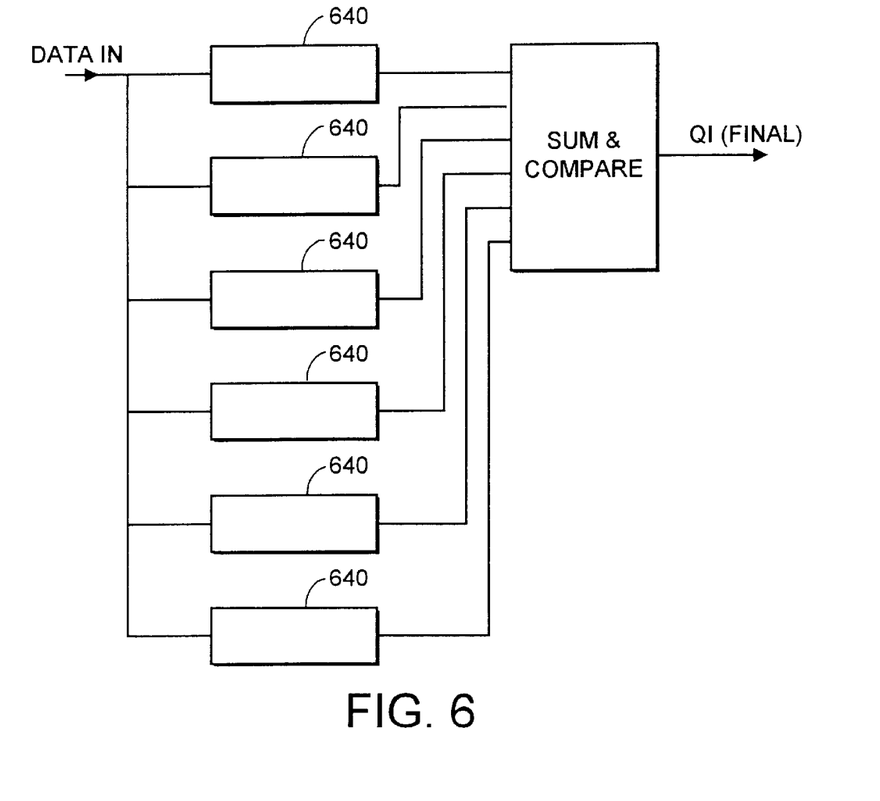
FIG. 6 is a schematic diagram of a previously proposed backsearch unit.

Referring to FIG. 6, a full backsearch unit comprises six elements 640 of the type shown in FIG. 5. Each of these elements 640 operates with a different quantization index, namely:

QI(out)

QI(out)+1 . . .

QI(out)+5.

The error signals produced by each of the elements 640, representing the differences between the quantized and inverse-quantized DCT data and the original DCT data, are summed over a sync block and compared by a sum and compare unit 650. The sum and compare unit 650 selects that one of the possible quantization indices tested by the six elements 640 to be used in the final quantization stage for encoding the DCT data: QI(final)—the quantisation index giving the lowest error rate summed over the sync block.

Figure 7:
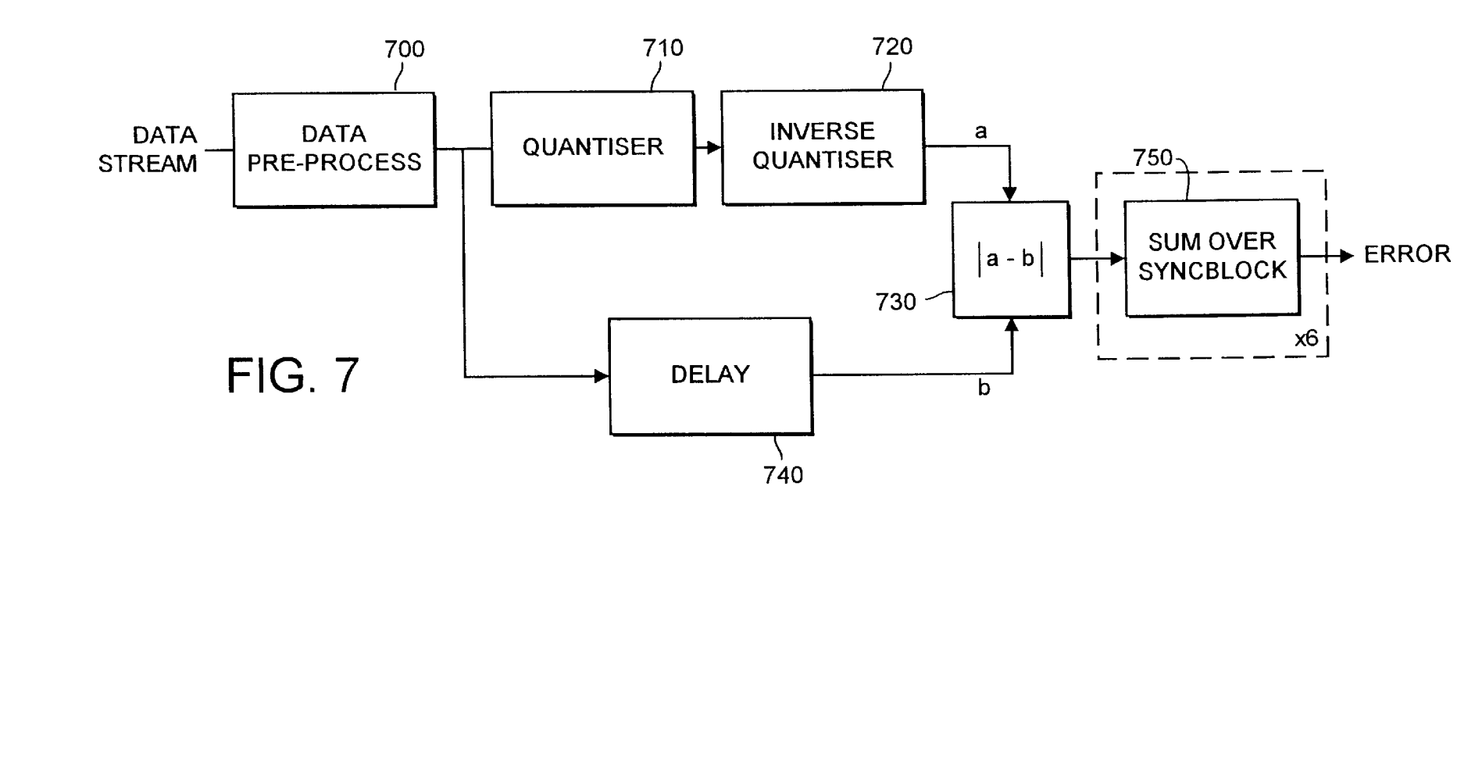
FIG. 7 is a schematic diagram of a backsearch unit according to an embodiment of the invention.

FIG. 7 is a schematic diagram of a backsearch unit according to an embodiment of the invention.

The backsearch unit of FIG. 7 comprises a data preprocessor 700, followed by a quantiser 710, inverse quantiser 720, subtractor 730 and delay 740 similar to those shown in FIG. 6. The output of the subtractor 730 is connected to a sum and compare unit 750.

In contrast to the previously proposed backsearch unit described earlier, FIG. 7 illustrates the whole of the backsearch unit, that is, the parts 710, 720, 730 and 740 are not repeated six times as in FIG. 6. The way in which this repetition of parts is avoided stems from the use and operation of the data pre-processor 700, and will be described below.

The data pre-processor 700 selects and stores a subset of the data stream supplied to the backsearch unit. It then supplies the subset of the data stream repeatedly to the quantiser 710 in a time-division-multiplexed manner. At each repetition, the quantiser 710 quantises the subset with a different quantisation factor, cycling through the range QJ(out) . . . QI(out)+5.

So, as a first data subset is processed, e.g. at a quantisation factor QI(out), the resulting error amount from the subtractor 730 is stored by the sum and compare unit 750. As the next subset is processed, at a quantisation factor QI(out)+1, the resulting error amount is also stored. This process repeats, so that the sum and compare unit 750 builds up six cumulative stored error values over the course of processing a sync block, one value for each of the six possible quantisation factors QI(out) . . . QI(out)+5. At the end of processing a sync block, the quantisation factor of the six possible values which gives the lowest cumulative error value is selected for the eventual quantisation of that sync block.

Figure 8:
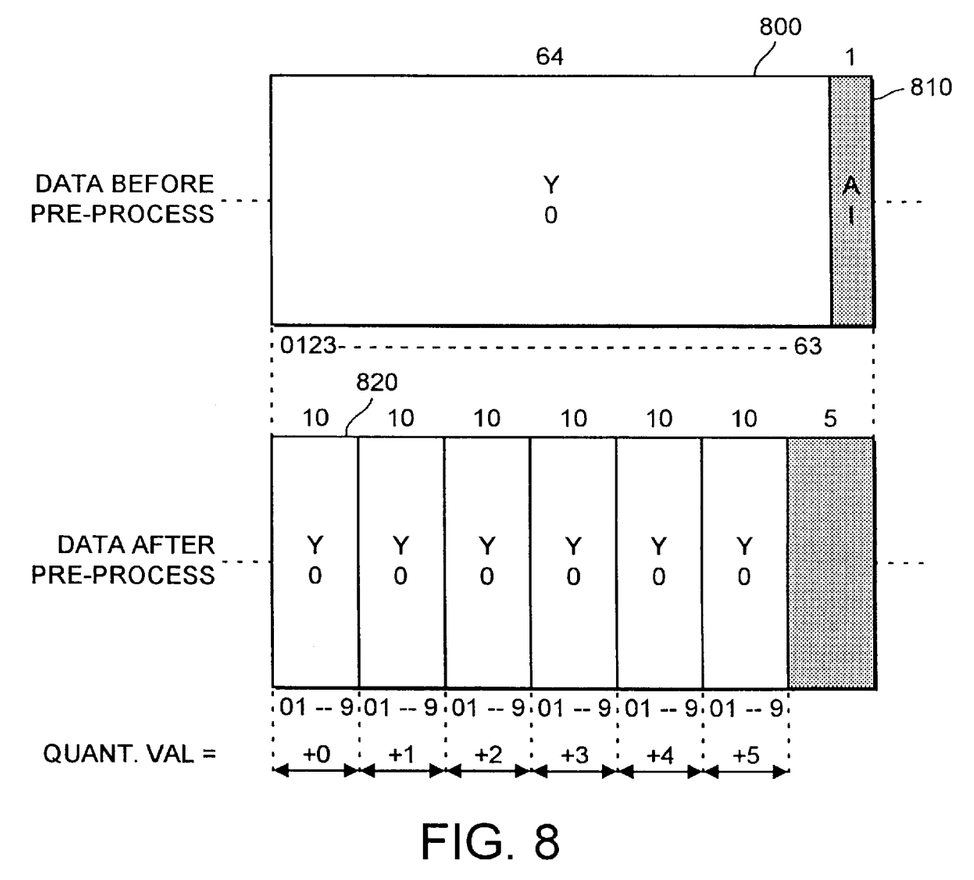
FIG. 8 is a schematic diagram of a data stream generated by the data preprocessor.

FIG. 8 is a schematic diagram of a data stream generated by the data pre-processor.

Each sync block is formed of a number of successive 64 byte DCT blocks 800, with one byte of control information 810. The data pre-processor 700 selects and stores a 10 byte subset 820 of the DCT block 800, and outputs that subset six times. By arranging that the subset 820 is no more than one sixth of the length of the original DCT block, the six repetitions of the subset 820 can be made in the time normally allocated to transmission of the original DCT block 800. So, the six trial quantisations and dequantisations required for the backsearch process can be performed successively, rather than in parallel, by using a single set of apparatus 710, 720, 730, 740 rather than six such sets in parallel.

As shown in the lower part of FIG. 8, five bytes of padding data are added after the six repetitions of the subset 810, to make up the same quantity of data as the original DCT block 800.

The subset 810 selected by the data pre-processor can be, for example, 10 DCT coefficients selected from predetermined positions within the data stream (e.g. the first 10 coefficients), 10 non-zero coefficients (e.g. the first 10 non-zero coefficients or the 10 largest coefficients), or another predetermined or pseudo-randomly selected pattern.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Data compression apparatus in which input data is compressed according to a target output data quantity using a stage of data quantisation, said apparatus comprising:
   (i) a data selector for selecting a subset of current data to be quantised;
   (ii) a data store for storing said subset of data;
   (iii) a backsearch quantiser and dequantiser for sequentially quantising and dequantising said subset of data at a plurality of degrees of quantisation,
   wherein said quantising and dequantising is performed sequentially and each successive sequence of said quantising and dequantising applies a respective degree of quantisation to said subset of data;

(iv) a comparator for comparing data quantised and dequantised by said backsearch quantiser with said stored subset of data, to detect errors introduced by said quantisation and dequantisation by said backsearch quantiser; and (v) a quantisation selector for selecting a final degree of quantisation for use in compression of said current data, said final degree of quantisation being that degree detected by the comparator to introduce the fewest errors during quantisation and dequantisation of said subset of data by said backsearch quantiser.

2. Apparatus according to claim 1, in which:

data to be quantised is received sequentially by said data selector in data blocks;

said data selector is operable to select a subset of each block of data;

said data selector and/or data store is operable to supply said subset to said backsearch quantiser and dequantiser repeatedly, with one repetition for each of said plurality of degrees of quantisation.

3. Apparatus according to claim 2, in which said subset is less than or equal to said block size divided by number of repetitions.

4. Apparatus according to claim 1, in which said data to be quantised are data representing one or more images.

5. Apparatus according claim 1, in which said data to be quantised are frequency separated data.

6. Apparatus according to claim 5, in which said data to be quantised are DCT data.

7. Apparatus according to claim 6, in which said subset of data comprises a predetermined number of lowest spatial frequency coefficients of said DCT data.

8. Apparatus according to claim 6, in which said subset of data comprises a predetermined number of non-zero lowest spatial frequency coefficients of said DCT data.

9. Apparatus according to claim 6, in which said subset of data comprises a predetermined number of numerically largest spatial frequency coefficients of said DCT data.

* * * * *